Aug. 23, 1960    C W. MUSSER    2,949,822
BOMB RELEASE MECHANISM
Filed Jan. 2, 1958

INVENTOR.
C WALTON MUSSER
BY
W. E. Thibodeau, O. J. Lynch & H. R. Johns

2,949,822

BOMB RELEASE MECHANISM

C Walton Musser, Beverly, Mass., assignor to the United States of America as represented by the Secretary of the Army Filed Jan. 2, 1958, Ser. No. 706,879

4 Claims. (Cl. 89—1.5)

(Granted under Title 35, U.S. Code (1952), sec. 266)

The invention described herein may be manufactured and used by or for the Government for governmental purposes without the payment of any royalty thereon.

This invention relates to bomb release mechanisms and more particularly to an improved bomb release mechanism which involves the provision of relatively few parts, is easy to construct and service and has a mode of operation much less complicated than heretofore realized.

Like the "Aerial Carry and Release Mechanism" disclosed by my co-pending application, Serial No. 424,790, filed April 21, 1954, now U.S. Patent 2,852,982, the mechanism of the present invention is arranged to respond to (1) manual control means, (2) electrical control means or (3) fluid pressure control means. It differs from the bomb release mechanism of the aforesaid co-pending application and from the bomb release mechanisms heretofore provided in the simplicity of its construction and operation.

This simplicity of construction will be appreciated when it is understood that the essential elements of this improved mechanism are (1) a piston having a hollow cylinder at one of its end and an extension at the other of its ends, (2) an outer cylinder closed at one of its ends and surrounding the piston, (3) a load support movably fixed to extension of the piston, (4) means for locking the support to the outer cylinder, (5) an inner cylinder mounted within the hollow end of the piston and adapted to receive an explosive cartridge, (6) a spring interposed between the piston and the inner cylinder, and (7) a spring interposed between the piston and the load support. This comprises seven essential elements as against the much larger number required in the construction of prior bomb release mechanism. Control of this improved mechanism is easily effected by control means extending through the closed end of the outer cylinder which is normally fixed to the airplane from which the bomb is dropped.

The invention will be better understood from the following description when considered in connection with the accompanying drawings and its scope is indicated by the appended claims.

Figure 1:
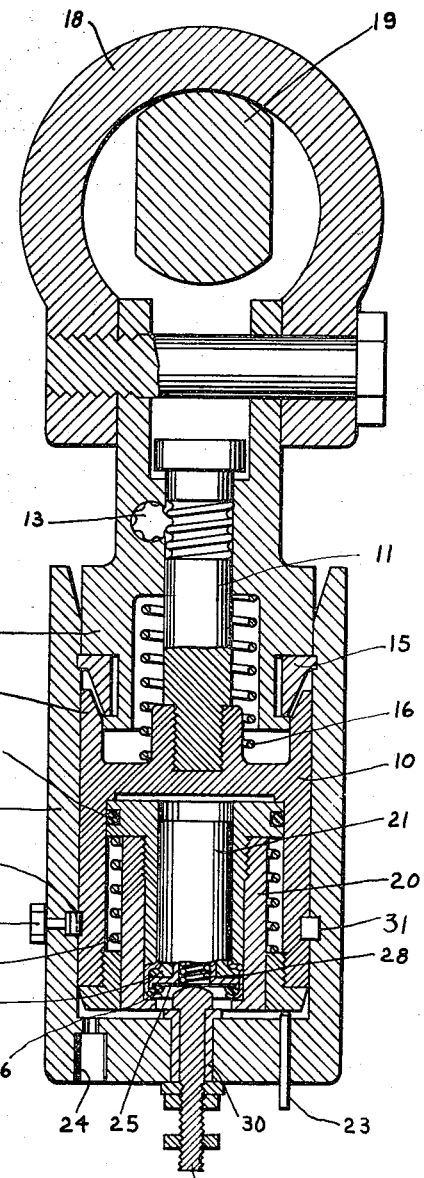

Figure 1 of the drawing illustrates, mostly in section, the various parts of the improved bomb release mechanism.

Figure 2:
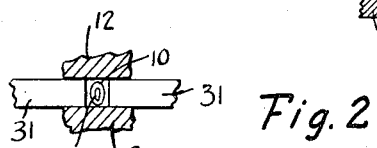

Figure 2 illustrates a typical camming means employed to unlock the compression type split piston ring 31, which functions as a safety lock.

This mechanism includes a piston having at one of its ends a hollow cylinder 10 and at the other of its ends an extension or rod 11. Surrounding the piston 10—11 is an outer cylinder 12 which is closed at one of its ends. Movably fixed to the rod 11 is a load support 14. A cam-shaped expansion type split piston ring 15 is interposed between a groove on the inner periphery of the cylinder 12 and a groove on the outer periphery of the support 14. A spring 16 is compressed when there is relative movement between the piston 10—11 and the support 14.

With the piston 10—11 and the support 14 in their illustrated positions, the resilience of the split ring 15 forces it into the groove of the cylinder 12 as illustrated. When the piston 10—11 moves away from the closed end of the cylinder 12, however, a wedge-shaped projection 17 on the piston contracts the ring 15 so as to remove it from the groove in the outer cylinder 12. This action releases the bomb together with all the mechanism enclosed within the cylinder 12. The same result may be achieved by rotating the key 13 and compressing the spring 16 until the ring 15 is retracted from the cylinder 12, this feature being provided for the convenience of the bomb loading and unloading personnel. It will be noted that the support 14 is provided with a ring 18 adapted to support a bomb suspension lug 19.

Within the hollow end 10 of the piston 10—11 is an inner cylinder 20 which surrounds an explosive cartridge 21 and has a sealing ring 33. Interposed between the inner cylinder 20 and the piston 10—11 is a spring 22. With this arrangement firing of the cartridge 21 drives the piston 10—11 away from the closed end of the cylinder 12 compressing the spring 22 and unlocking the load support 14 from the cylinder 12 as previously explained. The same result is achieved mechanically by applying force to the control member 23 or pneumatically by applying a liquid or gas under pressure to the piston 10—11 through an opening 24.

The cartridge 21 is of the hermetic sealed type and is electrically actuated. It will be noted that its closure disk 25 is insulated from the cartridge wall by an O-ring 26 and an insulator 27, the disk 25 being connected to the primer of the cartridge by spring 28. An electrical lead 29 in contact with the disk 25 is insulated from the end of the cylinder 12 by an insulator 30.

For locking the mechanism against accidental operation a compression type split piston ring 31 is arranged in opposed grooves on the outer periphery of the piston 10—11 and inner periphery of the outer cylinder 12. This ring normally contracts to its illustrated position so that the piston 10—11 is locked to the outer cylinder 12. Between the ends of this ring, however, is a cam 34 (shown in Figure 2) which is connected to a control knob 32 and is of such shape that rotation of the knob acts to spread apart the ends of the ring 31 and force the ring 31 radially outwardly from the groove in the piston.

In service, the outer cylinder is fastened to the airplane and the remainder of the mechanism is fastened to the bomb. In order to load a bomb into the airplane it is only necessary to lift the bomb together with the parts of the mechanism attached to it, so that the piston 10—11 enters the cylinder 12. As the piston is pushed into the cylinder, a chamfered end of the piston forces the safety ring 31 out into the groove in the cylinder 12 and a chamfered end of the cylinder 12 forces the ring 15 inside the cylinder. When the piston reaches the closed end of the cylinder 12, the rings 15 and 31 snap into place and the entire mechanism is locked together in a safe condition.

I claim:

1. A direct acting bomb release mechanism comprising an outer cylinder substantially closed at one end and open at the opposite end; a piston within said outer cylinder, said piston having a hollow end portion adjacent the closed end of said outer cylinder and a rod attached to its opposite end and a wedge-shaped projection portion located circumferentially at the opposite end of said piston; a load support movably fixed to said rod; a cam-shaped expansion type split piston ring interposed between a groove on an inner periphery of said outer cylinder and a groove on an outer periphery of said load support to lock said load support to said outer cylinder; a spring positioned between said load support and said piston to produce a load on said load support to maintain said ring in a locked position before a bomb is attached to said load support; an inner cylinder located within the hollow end portion of said piston; an explosive cartridge positioned within said inner cylinder for providing sufficient energy to move said piston toward the open end of said outer cylinder whereby said wedge-shaped portion of said piston forces the cam-shaped expansion type split piston ring to be cammed to an unlocked position thereby allowing said piston and load support to be released from said outer cylinder and to fall due to the weight of a bomb attached to said load support; and firing means for detonating said explosive cartridge.

2. A direct acting bomb release mechanism according to claim 1 having an auxiliary locking means comprising a compression type split piston ring arranged in opposed grooves on the outer periphery of the piston and the inner periphery of the outer cylinder and having camming means located between the ends of said compression type split piston ring for unlocking said compression type split piston ring manually.

3. A direct acting bomb release mechanism according to claim 2 having auxiliary manual release means comprising a screw thread located on said road and a mating key whereby rotation of said key causes said rod and piston to move toward the open end of the outer cylinder thereby causing said wedge-shaped portion of said piston to cam the expansion type split piston ring to an unlocked position and release the load support.

4. A direct acting bomb release mechanism according to claim 1 further characterized by said substantially closed end of said outer cylinder having a control member communicating therethrough, said control member having one end outside said outer cylinder and the other end articulated to the hollow end portion of said piston whereby manual movement of said control member toward the piston acts directly upon the piston to move said piston toward the open end of said outer cylinder.

References Cited in the file of this patent

UNITED STATES PATENTS

| | | |
|---|---|---|
| 1,734,236 | Smith et al. | Nov. 5, 1929 |
| 2,146,252 | Ell | Feb. 7, 1939 |
| 2,478,019 | Sonntag | Aug. 2, 1949 |
| 2,726,576 | Musser | Dec. 13, 1955 |
| 2,805,089 | Hansen | Sept. 3, 1957 |
| 2,828,982 | Kennedy | Apr. 1, 1958 |

FOREIGN PATENTS

| | | |
|---|---|---|
| 979,155 | France | Dec. 6, 1950 |